United States Patent

Anthony

[11] Patent Number: 5,815,830
[45] Date of Patent: Sep. 29, 1998

[54] AUTOMATIC GENERATION OF HYPERTEXT LINKS TO MULTIMEDIA TOPIC OBJECTS

[76] Inventor: Andre Charles Anthony, Hunters House, Cheshunt/Herts, England, EN7 6HQ

[21] Appl. No.: 575,728

[22] Filed: Dec. 18, 1995

[30] Foreign Application Priority Data

Dec. 23, 1994 [GB] United Kingdom .................... 9426165

[51] Int. Cl.⁶ ....................................................... G06F 17/30
[52] U.S. Cl. .................................. 707/6; 707/1; 707/501; 707/513
[58] Field of Search ..................................... 395/601, 606, 395/762, 774, 326

[56] References Cited

U.S. PATENT DOCUMENTS 4,982,344  1/1991  Jordan ..................................... 345/346
5,603,025  2/1997  Tabb et al. ............................... 395/602
5,608,900  3/1997  Dockter et al. .......................... 395/613

FOREIGN PATENT DOCUMENTS 0316957   5/1989  European Pat. Off. .
0501770   9/1992  European Pat. Off. .
0509947  10/1992  European Pat. Off. .

*Primary Examiner*—Paul R. Lintz
*Attorney, Agent, or Firm*—Dick and Harris

[57] ABSTRACT

Topic objects are stored with textual data objects containing references to other topic objects. The textual data objects are string-correlated to the topic objects to determine which topic objects are referenced in each textual data object. Hypertext links are generated for each reference in the textual data objects. The string-correlation is performed in a buffer in which each portion of text relating to a particular topic, having a unique topic name embedded, is concatenated and matched with the topic names. In the case of no match, one word is removed from the concatenated string to form a new string and the string-correlation is repeated.

25 Claims, 5 Drawing Sheets

AUTOMATIC GENERATION OF HYPERTEXT LINKS TO MULTIMEDIA TOPIC OBJECTS

FIELD OF THE INVENTION

The present invention relates to methods and systems of information management, and, more particularly to Hypertext information retrieval and display.

BACKGROUND OF THE INVENTION

In information management, there is an ever increasing need for systems which provide easy access to information, with minimum time spent in ordering or retrieving the information. In computing, several systems, such as databases and Hypertext, are known for facilitating the organisation of information.

A computer database typically comprises a number of records which are grouped in a single file. Each record comprises information stored as a set of fields; each record having the same field types. Proprietary software applications are available for creating and manipulating databases, such as: DBase™, Paradox™, and Approach™ which are available to run on IBM™ compatible machines running DOS or Windows™. Such applications allow data in a database to be rearranged, sorted, presented and printed according to criteria set by the user. The criteria may be, for example, to present a particular subset of records, or to reorder all records in the database. Prior art database manipulation techniques are thus useful for rearranging data which is easily categorisable into different fields. However, such techniques do not allow large quantities of textual data to be presented for easy digestion by the user. Moreover, manual manipulation of the data is necessary, which requires knowledge of the structure of the database.

A second, rather different method for managing information, is to cross-reference documents. Textual documents are more easily digested by cross-referencing than by re-ordering with database applications, as portions of text are cross-referenced to other relevant portions of text, allowing fast and easy access to relevant information. Cross-referencing implemented in this way is termed "Hypertext cross-referencing" or "Hypertext linking". Systems providing such capabilities are called "Hypertext systems". In order for existing hypertext systems to carry out this type of navigation, codes and/or instructions need to be embedded in the text by the author using a given "authoring" program. When the text is displayed using a compatible "viewing" program the codes and instructions, as embedded by the author (but now hidden from view), are interpreted and carried out. A large amount of time and effort is usually expended by the author.

Typically the following steps, as shown in FIG. 1, are carried out during the authoring process:

(a) identify a word or phrase from which to cross-reference (b) identify all occurrences of this word or phrase in the entire text (c) determine the location of the referred-to text i.e. its page number or other positional or relative location or its identifying label (d) mark each occurrence from step b) to show it is a cross-reference and also attach to it the result found in step c) to tell the system where to navigate to (e) repeat steps a to d for all cross-references.

This procedure would usually involve the author in having to mark cross-reference words and phrases with special codes or with some form of computer language. A known standard for coding such links is Hypertext Markup Language (HTML).

Depending on the system used, software support can be found to assist in the above processes, but the author is still required to identify and code cross-references. The coded text is then compiled: which means codes and instructions are validated, navigation links are resolved, text may be compressed. Compilation can take many hours; authoring, in the mechanistic sense, can take many months.

When new text is added to the publication, occurrences of words and phrases are inevitably added which are the same as existing cross-references, the above steps have to be repeated for them. If text which is referred-to is deleted then all cross-references to that text have to be found and any code or instructions nullified. Conversely, if new text is added which might be referred-to by existing text, then the entire document must be taken through steps a to e in order to add codes and instructions to existing text wherever it is required to make reference to the new text. The result is that the Hypertext file is static, in that items cannot be added or deleted without recompiling the entire Hypertext file.

A representation of a prior art Hypertext system is shown in FIG. 2. Once the authoring process is complete, the text portions are interrelated to one another in the manner described. To add new text, the author must decide which existing text portions should have links to the new text within the body of their text, and which existing text portions should have links from the body of new text. It can be seen that this is a time consuming, labour intensive operation.

SUMMARY OF THE INVENTION

It is, therefore, an object of the invention to provide a method of arranging and retrieving data in a computer which does not require the authoring process previously described. It is a more particular object of the invention to provide a method of cross-referencing data in a computer which does not require an author to identify and code links within the data. It is also an object of the invention to provide an effective method of searching data items within a system operating the invention.

These and other objects are accomplished by providing a method of associating portions of data stored in an information retrieval system, the system including:

a display; and a store for storing data as a plurality of data portions comprising data elements, each data portion having a unique reference name, the method comprising:

(a) reading the data elements of a first data portion of said plurality of data portions;

(b) comparing said data elements of said first data portion with each of said reference names;

(c) determining where occurrences of said references correspond to data elements in said first data portion and determining a set of data portions for which such occurrences are found;

(d) associating said first data portion with each of said data portions in said set of data portions; and (e) displaying said first data portion on said display.

The present invention may be implemented in a database in which each record comprises a data portion in the form of several pages of text relating to a particular topic, and a further field in the same record contains the unique reference in the form of a topic name. Other data is also contained in other fields of the same record. A data portion, such as text on a particular topic, is displayed for the user to read and digest. Just prior to displaying the topic text, the invention compares the text to references, such as topic names for text, pictures, video and sound, for other data portions containing information on other topics. Upon display of the text to the user, the invention indicates that other topic names have been found within the topic text being displayed and read by the user, and that an association has been created between the text being read and the other topics. The user may then request any one of the topics found in the comparison be displayed. If the requested topic is a text topic, the process is repeated for the new topic. If the requested topic is a picture, or video topic, it will be shown or played without moving from the current text topic. The invention thus provides a structure for cross-referencing text which does not require manual authoring of cross-reference links. This reduces the time and effort required to produce, and maintain hypertext documents, and eliminates the need for the author to identify a word or phrase from which to cross-reference. There is also, therefore, no need for the author to embed codes to indicate the existence of a cross-reference, or to specify instructions for navigation to the referred to text.

The comparison operation may be a string search; a preferred comparison method is described later. The association process provides links between data elements, such as words or phrases and data portions, such as passages of text, and other data portions. One may consider that, as a data element within a first data portion is associated with a further data portion, then that first data portion is effectively associated to the further data portion. The invention and drawings will, therefore, be described in terms of associating, by linking, portions of text to other text portions or pictures or sound.

Generally, the operating environment of the present invention includes a general purpose computer system having a processor, a memory, a display and associated peripheral equipment such as disk drive storage or other storage medium. In particular, the invention is embodied in an application operating in a Windows™ environment on an IBM™ compatible personal computer. The invention is, advantageously, operable in a computer network such as workgroups, local-area networks (LAN) and wide-area networks (WAN), remotely and internationally. When operating in a network, the store of data in the form of a database may be centrally located, with each network user having access to the information therein. As the text stored is only compared, and associated, with topic names at the moment of display, the links between text portions are always up to date. If a topic is added to the database, viewing users have immediate access to that text. Any existing text which happens to refer to the new topic will automatically be associated and show the new topic as a cross-reference link. Conversely, if the author deletes a topic, no links to it will appear on the system.

The invention is effective with respect to textual data stored as separate topics; each topic comprising a few pages of text. However, that the invention applies to other types of data, such as: images, sound, video, executable files or other data.

DETAILED DESCRIPTION OF THE INVENTION

Figure 1:
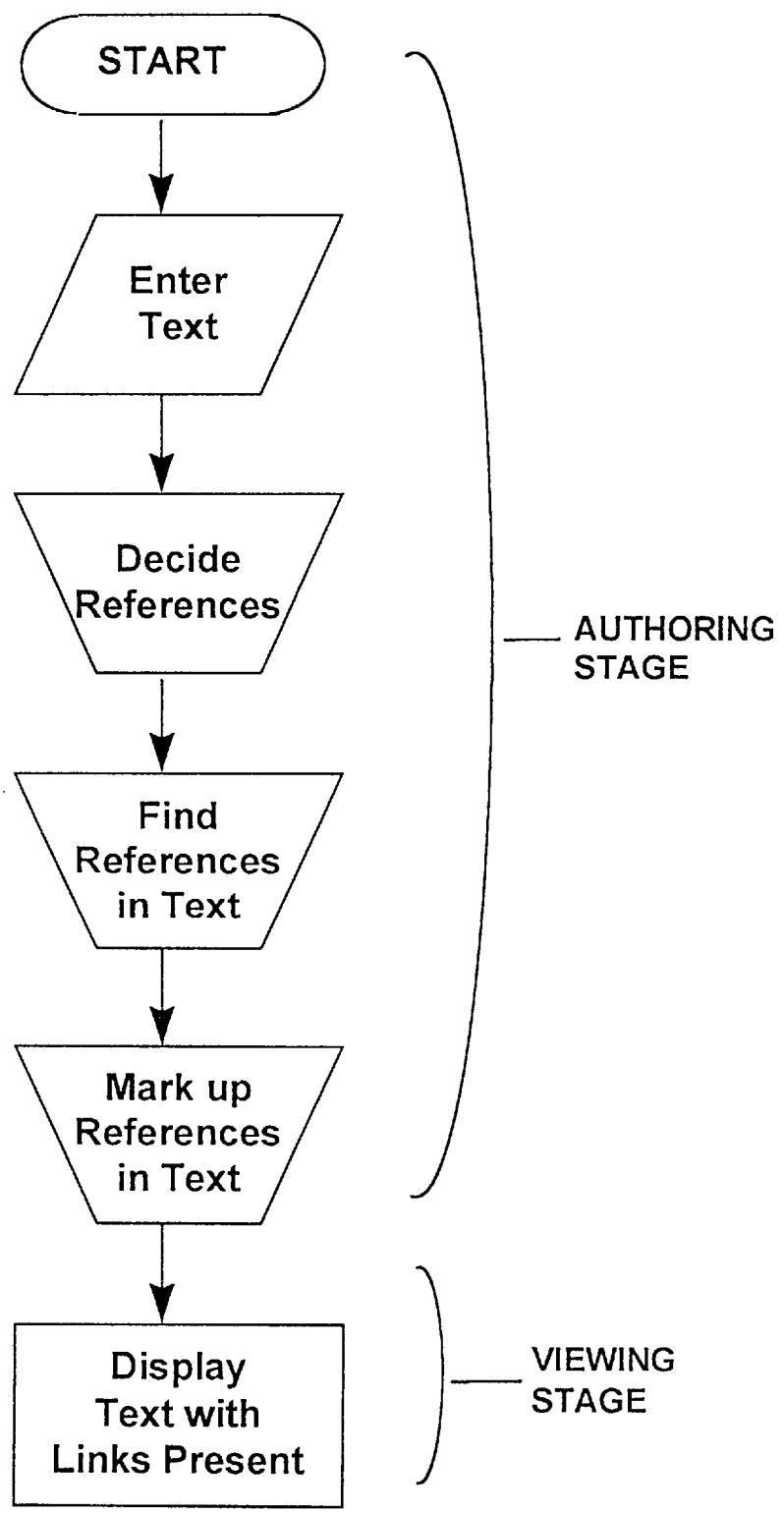
FIG. 1 is a flow diagram showing the prior art authoring process required to set up a hypertext system.
Figure 2:
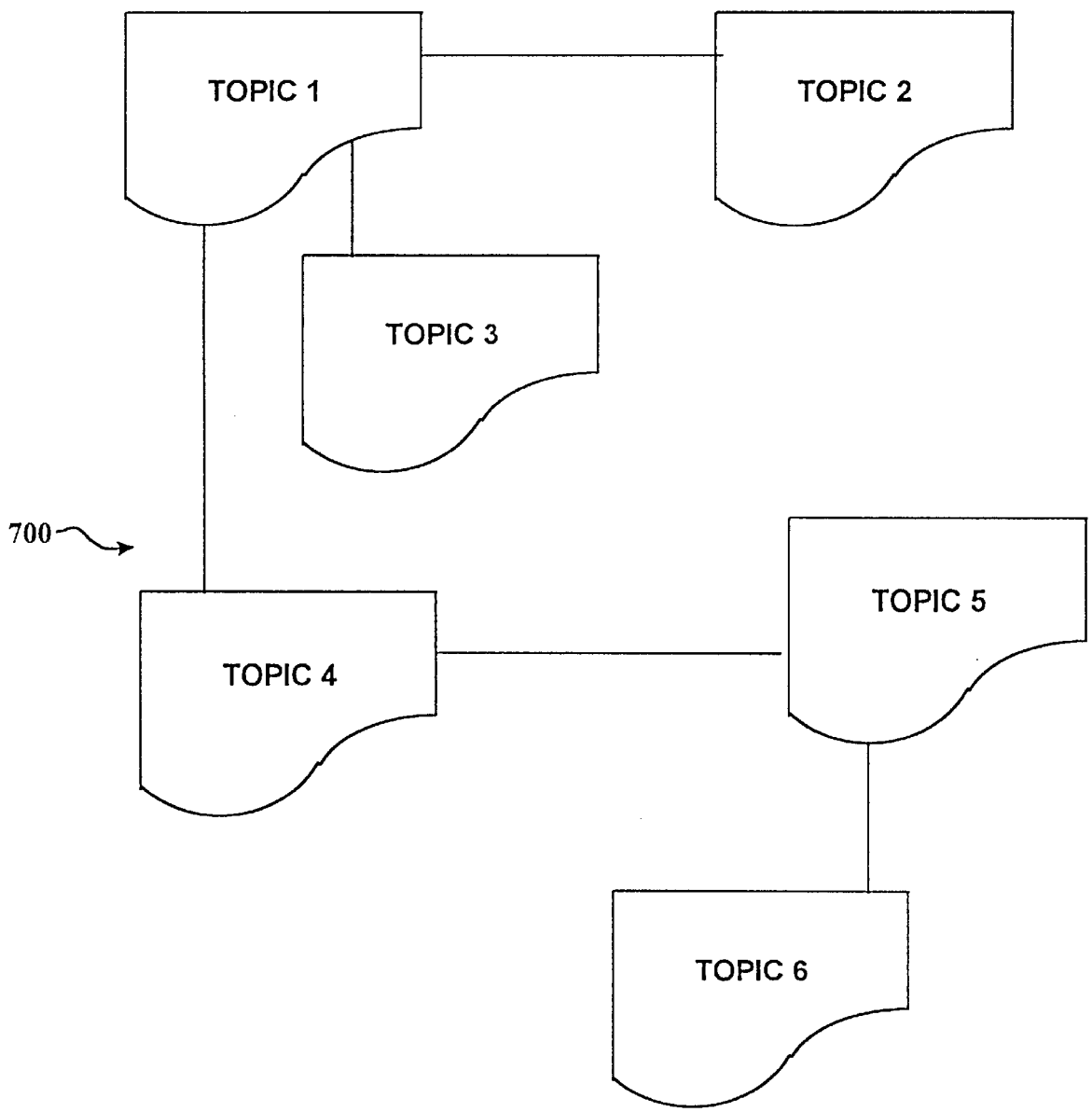
FIG. 2 shows the basic structure of links between text portions in prior art Hypertext systems.
Figure 3:
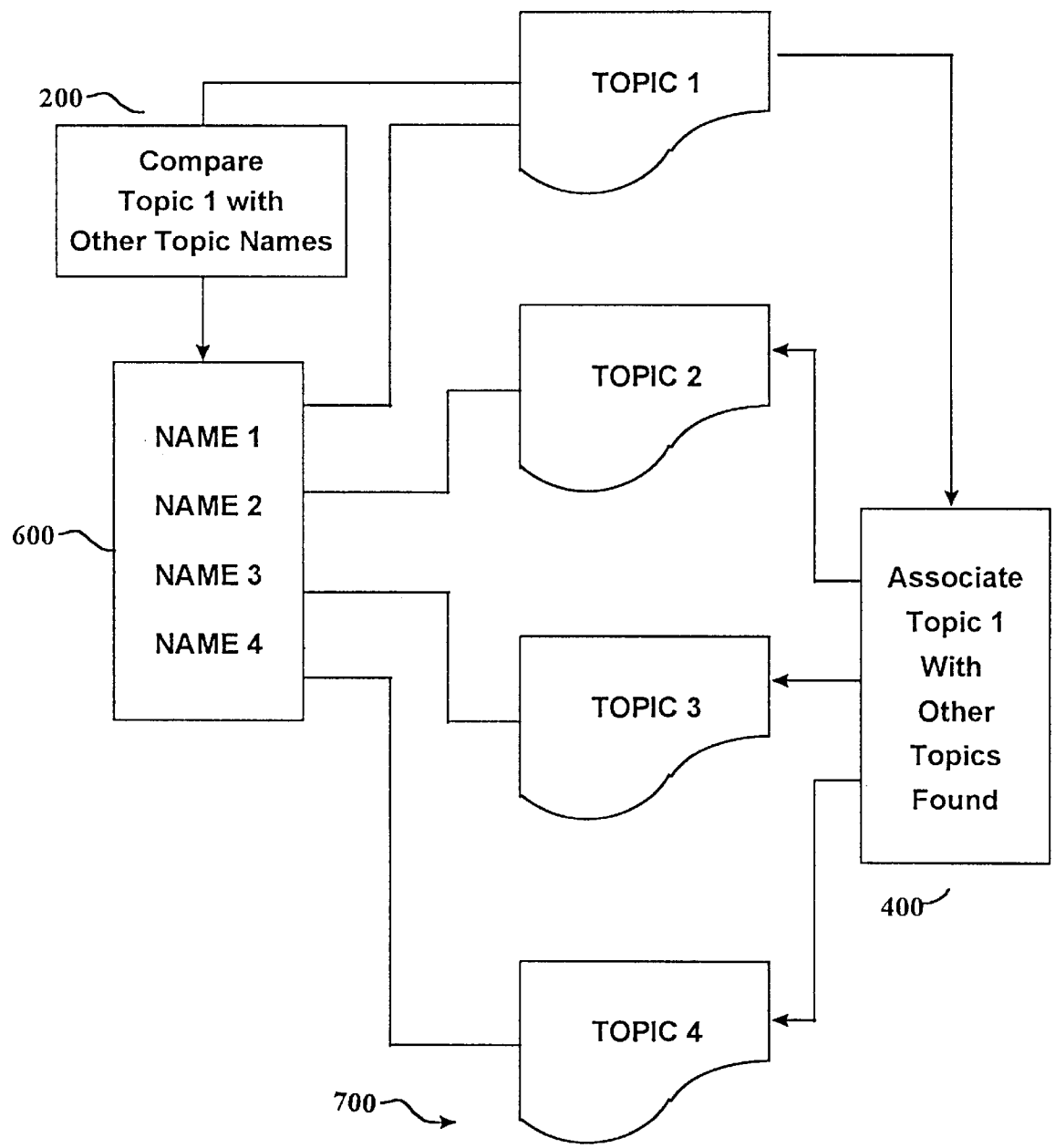
FIG. 3 shows the basic structure of links between text portions in a system according to the invention.

The basic structure of data organisation in a system using the invention is shown in FIG. 3. The data portions 700 and reference names 600 are stored in the form of a database; with a reference name stored as a first field in a record, and the data portion to which that reference refers stored as a second field in that record. A reference name 600 is a unique, meaningful name which indicates the subject matter of the data portion to which it refers. The name may be a word, a phrase or other string indicative of the topic of the data portion. A data portion comprises pages of text on a particular topic, as well as any images, sound, video or executables. We refer to a record in the database, comprising topic data such as text pages, pictures or sound, reference name and any further fields of data, as a HyperNODE™. The database itself containing the records is referred to as a HyperDB™, and the application of the invention is known as XGL Hypertext VOYAGER™. The process of creating associations between data is named Auto Hyperlinking™.

Information is input into a system using the invention in the following manner. Text for a topic is either typed into the database, input as an ASCII text file, or input from other applications such as wordprocessors and database applications. The text may then be manipulated by the user by "cutting and pasting" the text in the usual manner for Windows™ applications. Alternatively, text may be cut and pasted from other Windows™ applications, such as wordprocessors. Various wordprocessors and database applications provide suitable text formats, such as: WordPerfect™, Word™ and DBase™. The author may also import pictures or sound from other Windows applications. Using any of these techniques the author may easily input text and pictures to construct the database of topics, with each topic stored as a separate record. The user also defines the reference name for each topic at this stage. An embodiment uses the same standards as the Paradox™ database application produced by Borland™, with which a database produced for the present invention is compatible. The reader is referred to the package Paradox™ for further details on the codes and the manner in which data is stored for Paradox™ compatibility. Other platforms such as IBM VSAM™, DBase™ and Oracle™ are equally suitable, and the invention is not limited to any particular format.

Figure 4:
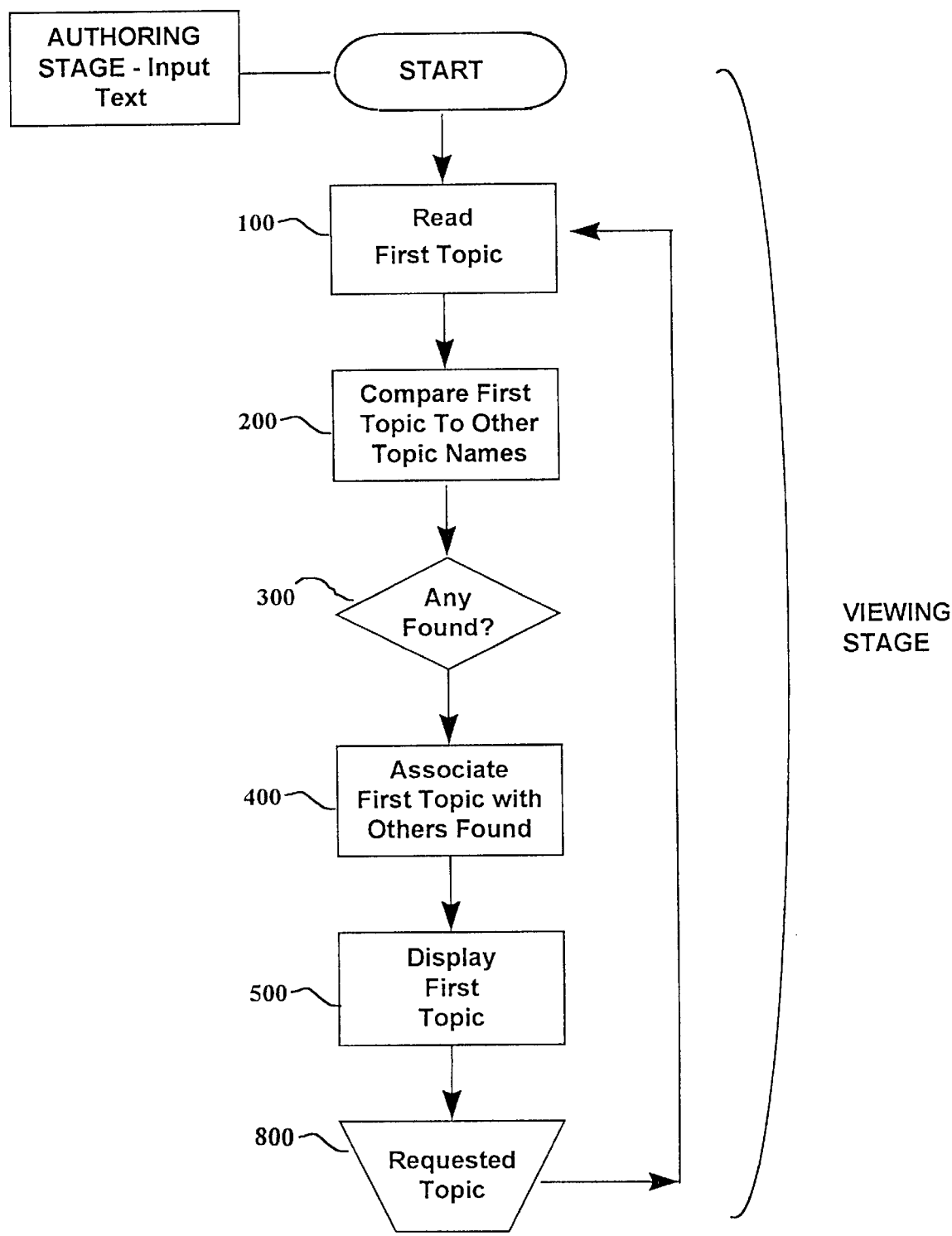
FIG. 4 is a flow diagram showing the basic processes of the invention.

Once a database has been constructed, as described above, the user may interrogate the database using the invention, the comparison process 200, and association process 400 are shown in relation to the database in FIG. 3. Referring now to FIG. 4, the first step 100 is to read a first topic selected by the user. This selection is made by positioning a cursor on the display, using a mouse, in the usual manner for Windows™. The selection of the topic may be from a list of available topics. On selection, the first page of topic text is compared 200 to the other topic names in the database and then displayed. The comparison is conducted by automatically searching for the occurrence of topic names in the body of text of the first page of the first topic. A preferred searching technique to conduct the comparison is described later. On finding a match 300, the matched topic name occurring within the text of the first topic is associated with the topic data of the topic to which the matched topic name refers.

Association 400 could involve simply indicating the existence of the related topic found in the search. However, the invention advantageously provides links, known as Auto_Hyperlinks™, meaning that the word or phrase in the text found to be a match with a topic name is highlighted on the display, and linked to the topic to which the topic name refers. The user may then jump to the associated topic by selecting the highlighted word or phrase in the first topic text, as in prior art Hypertext systems, or if the associated topic is a picture it is displayed on selection. The link is made with reference to the database which stores the topic text, reference name and other identifiers. Such identifiers note the location of the data for each topic, and provide the navigational links for the hypertext jumps.

Prior to displaying the first page of a topic, the comparison with the topic names is conducted for that page. The comparison for subsequent pages of that topic is also undertaken, preemptively while the first page of text is displayed, until the entire text for that topic has been compared, or the user has moved to a new topic 500. Text is thus linked a page at a time for the topic the viewing user has requested. The invention thus assumes that the user is likely to display the next page of the topic and so preemptively links the next pages while the user is reading the first page. The sequence is then repeated for the newly displayed topic as shown by steps 100 and 500 in FIG. 4.

Figure 5:
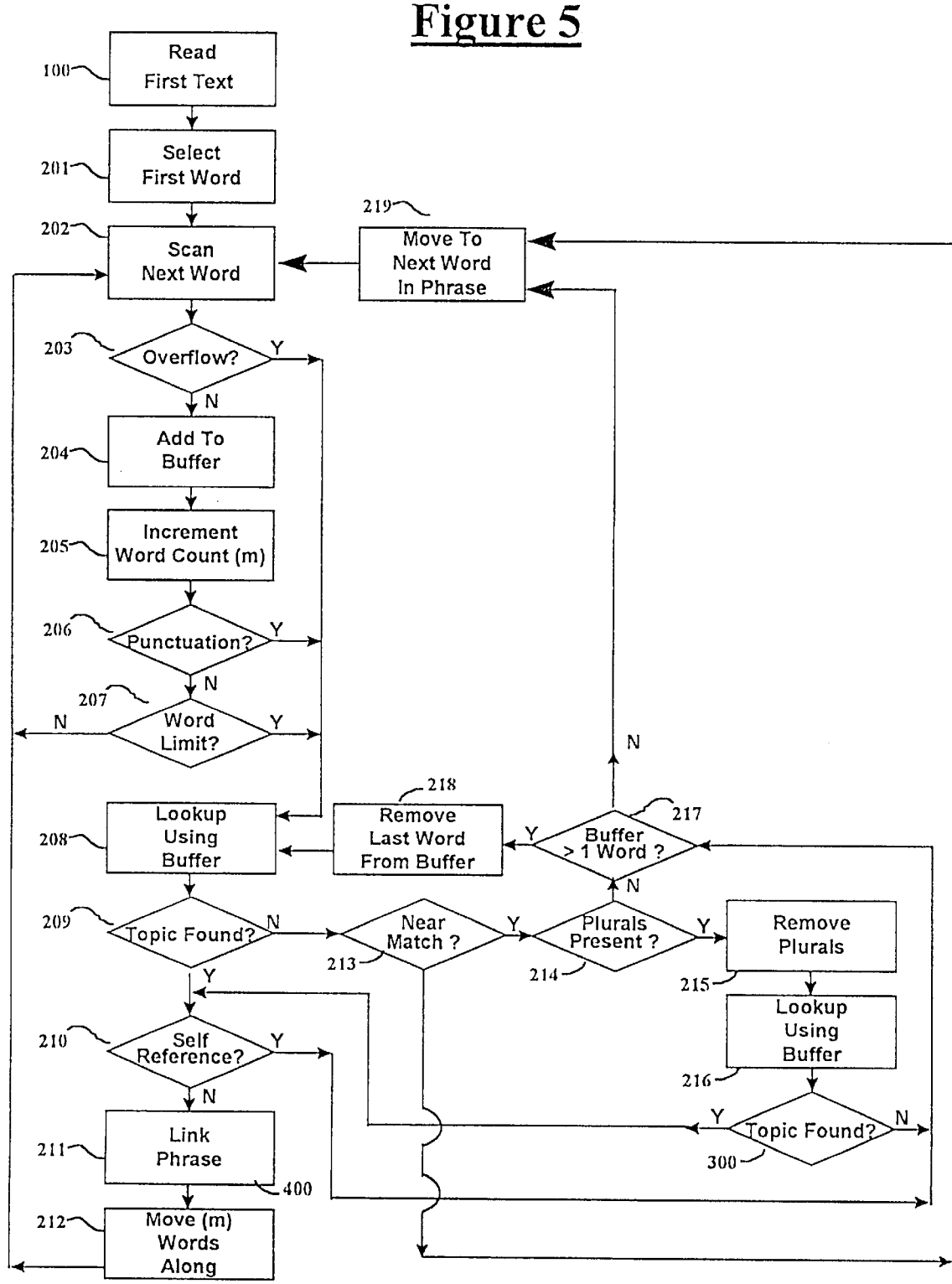
FIG. 5 shows in detail a flow diagram of the preferred embodiment of the invention.

The invention is set out in the flow chart of the invention of FIG. 5. The first page of text is read 100, the first word 201 selected and the next word of text 202 is scanned. If the word overflows the user predefined topic name length 203, then the database of topic names is searched in comparison to the concatenation buffer contents 208. If the word does not overflow 203, then the word is added to the buffer 204, and the word count is incremented by one 205. If the word ends in punctuation 206, the contents of the buffer is searched against the topic names 208. If no punctuation is present, and the predefined buffer word limit is not reached 207, the next word 202 is scanned. In this way, steps 202 to 207 successively scan words and adds them to the concatenation buffer until the predefined word limit is reached. At this point the concatenated phrase is searched against the database. If a topic is found 209, a link is created 211 (providing that the name does not refer to the present topic 210) and the process moves m words along, where m is the word count in the buffer. At this point the buffer is cleared in preparation for the next set of steps 202 to 207.

If no match is found with the buffer search term having the user defined maximum number of words, and a near match is found 213, the steps 213 to 218 check for plurals and, if still no match is found, successively removes the last word added to the buffer and compares the buffer contents with the list of topic names until a match is found. If no match is found, the system moves to the next word along 219 and starts the comparison again at 202. Once sufficient text has been processed to fit the size of the display window of the display, the processed text is diplayed. Upon displaying the first page, the invention continues to repeat the above process for subsequent pages of the topic text.

A database has been created to cover the subject area: planets of our solar system. The database contains the following text and picture topics:

| | |
|---|---|
| Earth | Io |
| Jupiter | Mars |
| Mercury | Neptune |
| Our moon | Planet |
| Pluto | Rings of Saturn. |
| Ring system | Satellites of Jupiter |
| Saturn | Solar System |
| The red spot (picture topic) | |
| Uranus | Venus |

Topic being viewed by user: Planet

Text for topic planet:

There are ten major known planets in our solar system. Jupiter is the largest, with a diameter ten times that of the Earth. There are 12 satellites of Jupiter or moons, the most famous being Io. Jupiter which also has a faint ring system nowhere near as prominent as the rings of Saturn is famous for the red spot which is 3 times the diameter of the earth. Saturn is the second largest planet . . . .

The text for the topic planet is shown above. The words highlighted in bold and underlined have been automatically shown as hyperlinks. These words or phrases have been found to exist on the database as topics in their own right and the logical deduction from this is that there is more information available for them so they are automatically cross-referenced or Hyperlinked. If the user clicks the mouse on any of the hyperlinked words which refer to a text topic, they would automatically be taken to that topic and its associated topic text would be displayed with again any hyperlinks automatically found and highlighted as above. If the hyperlinked phrase "the red spot" is selected, the picture associated with the phrase is displayed without moving off the present text topic. In the above example the word planet is not hyperlinked because it relates to itself.

The following illustrates how concatenation and the finding of hyperlinks in the above text is achieved.

| Concatenated Key | Operation performed |
|---|---|
| There are ten | First group of 3 words are concatenated and then a lookup is done with the key "There are ten" to see if a topic of this name exists. As it does not, the search continues with the next words. |
| are ten major | Next group of 3 words are concatenated |
| ten major known | And so on . . . |
| major known planets | |
| known planets in | |
| planets in our | |
| in our solar | |
| our solar system | |
| solar system. | Full stop causes concatenation of only these two words. As a match has been found, these words are marked as an Auto hyperlink. The process now continues, with the word immediately following the word "system". |
| Jupiter is the | Near match found, so continue with these words |
| Jupiter is | |
| Jupiter | Match found, so search continues after "Jupiter". |
| is the largest | |
| the largest with | |
| etc . . . | and so on until |
| 10 satellites of | |
| satellites of Jupiter | Match found on this phrase |
| etc . . . until | |
| being are Io. | |
| are Io. | Full stop causes concatenation of two words |

-continued

| Concatenated Key | Operation performed |
| --- | --- |
| | only |
| Io. | Match found |
| Jupiter also has | Near match found so continue to try these words |
| Jupiter also Jupiter as the rings | Match found |
| the rings of | |
| rings of Saturn. | Match found |
| the red spot | Match found, and end of text. |

In this example the user defined maximum number of words to be concatenated is three. The searching process described above is an effective way of comparing text for matching strings comprising several words.

It should be noted that, whilst the invention has been described with reference to textual data, it is clear that the invention is applicable to other types of data. In essence, the invention provides a dynamic structure for relating information in a store, and displaying the information, along with links between the data found by the invention. The data portions can be any suitable data, particularly alphanumeric data. For non-alphanumeric data, such as images, video or executables, the data has a reference name as with textual data portions. This reference name may be searched within text of other data portions and linked in the manner described. A phrase in a document may, therefore, refer to an image name which, when selected, automatically displays the image having that name. If the referred to data portion is an executable file, that executable will be executed on selection of its name from the highlighted text. Many applications other than simple cross-referencing may thus be envisaged. Executable management in this way provides a useful system for a user to perform operations such as copying or deleting data, or other disk and memory management functions.

In the embodiment described the invention is particularly effective as the association of data portions is undertaken just prior to display of the selected topic. This ensures that the system is always up to date unlike prior manually authored systems which are only updated when the author manually adds the links. This aspect allows multiple users to add topics to the database without the need to be aware of the topics already stored on the system. In the context of a news system, for example, individuals may add news from different parts of the world onto the system without the need of communicating with one another. Since the association of topics occurs just prior to display, the database thus formed is always instantly up to date requiring no manual authoring or compilation.

Further rules of topic association other than simply searching for identical and similar word strings or using the concatenation search previously decribed may also be used. For example linguistic rules may be incorporated so that the phrase "moons of jupiter" within a portion of text is associated with a topic having the topic name "jupiter's moons". Other linguistic rules may also be applied such as associating a topic with the topic name "people" with an occurence of the word "person". These and other linguistic rules are within the scope and spirit of the invention.

It should also be noted that the topic names and text portions do not have to be stored in a database, and could be stored as separate files, or otherwise. A list of topic names could also be stored as a single file, with the topic text stored as a single flat file. The invention may thus be implemented in a variety of environments and platforms other than the embodiment described. As well as implementing the invention to run on a computer to provide hypertext information to a user on a computer, the invention can be used to provide hypertext information on a television. Some examples of useful television applications are: a news service providing up to date hypertext pages of news, a TV programme information service or an educational/exploratory service.

Taking the news service as an example: with news coming in all the time, a set of news pages could be dynamically maintained by several authors using the invention, all updating the same HyperDB. On detecting that a topic text has been changed the invention would hyperlink the text pages of that topic in the same way as described earlier. But instead of displaying the pages, the invention would pass the newly hyperlinked topic text to a Text Transmission Control Unit (TTCU) or some such similar processor. The TTCU would store the said pages, which would include appropriate indicators to distinguish hypertext words and phrases and also a news page number associated with each such hypertext reference. The TTCU, when all pages for a topic have been stored, would broadcast the said topic text as a number of pages. In normal operation the TTCU would be broadcasting all news pages continually so that any TV user could be receiving any page at any time. If a new topic has been added or one deleted from the database, the invention on detecting such events (as is currently done when the invention is run on a network) would automatically hyperlink, as described before, all the topics on the news database and pass each page to the TTCU which would again store them. Specifically in this event (adding/deleting of entire topics) the TTCU would receive and store all pages of the news database before it started to broadcast any of the new pages. This is because the hypertext linking would now relate to the entire set of pages comprising the news database including added or deleted topics.

If a TV user were to select a particular hypertext link the news page associated with the selected link would simply be displayed on the TV. This "jump" technology already exists in that you can display different pages of teletext or similar at will. Such similar technology could be used to achieve the jump associated with the hypertext link within the news pages, but with the additional advantages provided by the association process of the invention. Alternatively, a small piece of software (an extension of the implementation of the invention) would reside in all TV's capable of receiving hypertext pages from the invention.

A third alternative is that the same or similar piece of jump software from the invention could be implemented on the newly emerging TV-PC technology. Such jump software could be made freely available as part of the normal software provided with the TV-PC technology. Selection of a conventional PC or similar is typically done using a mouse by pointing and clicking. Televisions do not have an equivalent device, though a mouse roller ball and a selection button could be incorporated into the remote control. The usage of these would be conventional; the user would manipulate the roller ball to position a cursor on the screen and then press the button to select the item where the cursor rests.

Taking the television programme service as a second example: A set of television programme pages could be dynamically maintained by a number of authors. The pages would be equivalent to published journals like the BBC Radio/TV Times. This example would work in the same way as the example on the news service with the addition of a further feature.

The additional feature requires the use of a TV-PC instead of just a TV. The invention will further enable the authors to include in the programme information a Unique Alphanumeric Code (UAC) associated with each television, radio and future multi-media/virtual-reality/cyber-space programmes. The invention would enforce uniqueness when authors assigned a UAC to a programme. The invention when hyperlinking would for every found hyperlink include, as well as the page number as before, the UAC if a UAC existed for the reference hyperlink. Such pages as before would not be displayed but passed to the TTCU. The TTCU would broadcast hypertext pages as normal but also include the UAC (where one exists) with every hypertext reference.

In this application, the TV-PC user will be able to not only jump to different pages of hypertext information, but also to indicate to the TV-PC to store any hypertext reference and its UAC in a Personal Programme Schedule (PPS). The PPS could then be reviewed by the TV-PC user and each programme entry could be marked by the user to indicate actions that the TV-PC is to take such as "get me to watch/hear", "record on video or audio or CD or PC memory", or "censor" (stopping children watching inappropriate programmes). Once in the system the software would allow the user to add/remove further items and would be able to warn of scheduling conflicts, amount of tape/memory required to record selected programmes, etc. This provides the user with far greater control over the watching and recording of programmes. It assumes the TV-PC technology will also be connected to a Hi-Fi system which includes a radio and tape recorder.

It should be understood that the foregoing description of the present invention is illustrative only. Thus, although only a few examples of the invention have been described in detail, it is clear that the features of the present invention may be adapted without departing from the spirit of the invention.

What is claimed is:

1. A method of searching similar strings in a system for associating portions of text stored in an information retrieval system, the system including:
    a display; and
    a store for storing data as a plurality of portions of text, each portion of text relating to a particular topic, and having a unique topic name stored therewith;
    said method of searching comprising:
    comparing a first concatenated string of words in said text with said topic names;
    determining whether a topic name matches said concatenated string;
    removing one of the words from the concatenated string to form a new string if no match is found; and
    comparing the new string with said topic names.

2. A method of associating portions of data stored in an information retrieval system, the system including:
    a display; and
    a store for storing data as a plurality of data portions comprising data elements, each data portion having a unique reference name,
    the method comprising:
    (a) reading the data elements of a first data portion of said plurality of data portions;
    (b) comparing said data elements of said first data portion with each of said reference names;
    (c) determining where occurrences of said references correspond to data elements in said first data portion and determining a set of data portions for which such occurrences are found;
    (d) associating said first data portion with each of said data portions in said set of data portions; and
    (e) displaying said first data portion on said display.

3. A method of associating portions of data stored in an information retrieval system according to claim 2, wherein the data portions and references are stored as records in a database.

4. A method of associating portions of data stored in an information retrieval system according to claim 3, wherein each said record comprises a first field for reference names, and a second field for data portions.

5. A method of associating portions of data stored in an information retrieval system according to claim 2, wherein at least one of the data portions comprises an image.

6. A method of associating portions of data stored in an information retrieval system according to claim 2, wherein at least one of the data portions comprises video data.

7. A method of associating portions of data stored in an information retrieval system according to claim 2, wherein at least one of the data portions comprises an executable.

8. A method of associating portions of data stored in an information retrieval system according to claim 2, wherein at least one of the data portions comprises sound data.

9. A method of associating portions of data stored in an information retrieval system according to claim 2, wherein the comparison to find corresponding references for said data elements comprises searching for a reference which is identical to one of said data elements.

10. A method of associating portions of data stored in an information retrieval system according to claim 2, wherein the system comprises a buffer, said method further comprising selecting a predetermined number of adjacent data elements in said first data portion, storing said adjacent data elements in said buffer, and comparing the contents of said buffer to said references.

11. A method of associating portions of data stored in an information retrieval system according to claim 10, wherein one of said adjacent data elements stored in said buffer is removed from said buffer if the contents of said buffer is not identical to one of said references, and said buffer contents is subsequently compared to said references.

12. A method of associating portions of data stored in an information retrieval system according to claim 11, wherein said buffer has a user defined buffer limit which determines the predetermined number of data elements stored.

13. A method of associating portions of data stored in an information retrieval system according to claim 2, wherein:
    at least one of said data portions comprises alphanumeric data on a particular topic;
    said data elements comprise alphanumeric strings; and
    said reference of said data portions are alphanumeric topic names.

14. A method of associating portions of data stored in an information retrieval system according to claim 2, wherein:
    at least one of said data portions comprises pages of text on a particular topic;
    the data elements comprise text strings; and
    the reference of said at least one of said data portions is a textual topic name.

15. A method of associating portions of data stored in an information retrieval system according to claim 14, wherein there are plurals within said pages of text and the comparison searches for singulars of said plurals in said references.

16. A method of associating portions of data stored in an information retrieval system according to claim 14, wherein the comparing operation comprises scanning said pages of text for words and phrases and punctuation is temporarily stripped out.

17. A method of associating portions of text stored in an information retrieval system, the system including:

a display; and a store for storing data as a plurality of data portions at least one of which is text, each portion relating to a particular topic, and having a unique topic name stored therewith, the method comprising:

(a) reading said at least one portion of text of said plurality of portions;

(b) comparing the text of said at least one portion of text with each of said topic names;

(c) determining a set of portions of data for which occurrences of said topic names are found in said at least one portion of text;

(d) associating said at least one portion of text with each of said portions in said set of portions of data; and (e) displaying said at least one portion of text.

18. A method of associating portions of text stored in an information retrieval system according to claim 17, wherein said association includes indicating that occurrences are found by highlighting said occurrences in said first portion of text.

19. A method of associating portions of text stored in an information retrieval system according to claim 18, wherein said association provides a link to said portions of data in said set of portions of data such that selection of one of said highlighted occurrences displays, plays or executes the data portion having the reference of said occurrence.

20. A method of associating portions of text stored in an information retrieval system according to claim 17, wherein said topic names have related topic identifiers.

21. A method of associating portions of text stored in an information retrieval system according to claim 18, wherein said topic names have related topic identifiers and said link is created with reference to said identifiers.

22. A method of associating portions of text stored in an information retrieval system according to claim 17, wherein said data portions and topic names are stored as records in a database.

23. A method of associating portions of text stored in an information retrieval system according to claim 17, wherein said database comprises a first field and a second field, and said first field comprises said topic names and said second field comprises said data portions.

24. A method of associating portions of text stored in an information retrieval system according to claim 17, wherein the system comprises a buffer, said method further comprising selecting a predetermined number of adjacent words in said at least one portion of text, storing said adjacent words in said buffer, and comparing the contents of said buffer to said topic names.

25. A method of associating portions of text stored in an information retrieval system according to claim 24, wherein one of said adjacent words stored in said buffer is removed from said buffer if the contents of said buffer is not identical to one of said topic names, and said buffer contents is subsequently compared to said topic names.

* * * * *